United States Patent
Dlugos et al.

(12) 
(10) Patent No.: US 6,191,687 B1
(45) Date of Patent: Feb. 20, 2001

(54) WIEGAND EFFECT ENERGY GENERATOR

(75) Inventors: David J. Dlugos, Beacon Falls, CT (US); Don Small, San Juan Capistrano, CA (US); David A. Siefer, Orange, CT (US)

(73) Assignee: HID Corporation, Irvine, CA (US)

( * ) Notice: Under 35 U.S.C. 154(b), the term of this patent shall be extended for 0 days.

(21) Appl. No.: 09/159,439

(22) Filed: Sep. 24, 1998

(51) Int. Cl.$^7$ ................................................ G08B 29/00
(52) U.S. Cl. .................. 340/506; 340/551; 340/552; 307/419
(58) Field of Search .................. 340/500, 551, 340/552, 567, 506; 307/419

(56) References Cited

U.S. PATENT DOCUMENTS

| | | | |
|---|---|---|---|
| 3,820,090 | 6/1974 | Wiegand | 365/133 |
| 4,008,458 | 2/1977 | Wensley | 340/870.02 |
| 4,185,730 | 1/1980 | Roes et al. | 194/210 |
| 4,189,674 | * 2/1980 | Lathlaen | 324/408 |
| 4,217,512 | * 8/1980 | Hauler et al. | 310/155 |
| 4,247,601 | 1/1981 | Wiegand | 428/611 |
| 4,263,523 | 4/1981 | Wiegand | 307/419 |
| 4,484,090 | 11/1984 | Wiegand et al. | 307/419 |
| 4,553,657 | 11/1985 | Kilmartin et al. | 194/213 |
| 4,593,209 | 6/1986 | Sloan | 307/419 |
| 4,736,122 | 4/1988 | Opie et al. | 307/419 |
| 4,743,780 | 5/1988 | Opie | 307/419 |
| 4,758,742 | 7/1988 | Opie | 307/419 |
| 5,216,234 | 6/1993 | Bell | 235/494 |

OTHER PUBLICATIONS

Sensor Engineering Co. (an Echlin Co.) 1990 "Zero Power Wiegand Sensor" 2 pgs.

* cited by examiner

*Primary Examiner*—Daryl Pope
(74) *Attorney, Agent, or Firm*—Reed Smith Shaw & McClay LLP

(57) ABSTRACT

A Wiegand sensor is provided as a power source for an external circuit, wherein an alternating magnetic field changes the magnetic state of a Wiegand wire within the Wiegand sensor which, in turn, produces a substantial output pulse that is provided as a power source for the external circuit. The external circuit may be a transmitter that is powered by the output of the Wiegand sensor and upon being powered transmits an information signal to an appropriate receiver. The number of occurrences that the magnetic field alternates corresponds to and is ascertained from the number of information signals that are transmitted. The alternating magnetic field may be generated by magnets coupled to a rotating valve of a gas or water meter such that the occurrence of each transmission of the information signal represents the flow of a predetermined amount of gas or water through the meter. The use of a transmitter that is powered solely by a Wiegand sensor that senses the rotation of a meter allows for that meter to be placed in a generally inaccessible area wherein an appropriate receiver may be utilized to receive each transmitted information signal and to maintain the number of occurrences the transmitted information signal is received. The external circuit may be any number of other types of circuits including a transmitter that transmits an alarm signal to a receiver coupled to an alarm system, or a counter circuit that increments a count value stored therein each time the counter circuit is powered by the Wiegand sensor.

21 Claims, 1 Drawing Sheet

WIEGAND EFFECT ENERGY GENERATOR

BACKGROUND OF THE INVENTION

This invention relates to a Wiegand effect energy generator and, more particularly, to the use of a Wiegand sensor as an energy generator.

The Wiegand wire is a ferro magnetic wire having core and shell portions with divergent magnetic properties. The currently preferred type of Wiegand wire is disclosed in U.S. Pat. No. 4,247,601, issued on Jan. 27, 1981, and which is incorporated herein by reference. The Wiegand wire generally is used in combination with a read head\Wiegand sensor which provide an output pulse from a switch in state of the Wiegand wire. Examples of such a read head\Wiegand sensor are described in U.S. Pat. Nos. 4,263,523, 4,593,209, 4,736,122, 4,743,780 and 4,758,742. Wiegand sensors also are currently available from, for example, HID Corp.

Read heads for use with a Wiegand wire are currently employed in various access systems, wherein Wiegand wires within the access cards provide the encoded information. Wiegand sensors are useful to detect angular velocity in various devices including, for example, meters, disk drives, automobiles, and so on.

Wiegand sensors have various other practical uses that have not yet been realized. One such application is as an energy generator and, therefore, it is an object of this invention to utilize a Wiegand sensor as an energy generator.

Various other objects, advantages and features of the present invention will become readily apparent to those of ordinary skill in the art, and the novel features will be particularly pointed out in the appended claims.

SUMMARY OF THE INVENTION

In accordance with an embodiment of the present invention, a Wiegand effect energy generator is comprised of an alternating magnetic field generator and a Wiegand sensor that includes a Wiegand wire that changes a magnetic state thereof in response to the alternating magnetic field. The Wiegand sensor supplies as an output a power signal that corresponds to the power produced from the change of the magnetic state of the Wiegand wire.

As an aspect of the invention, the alternating magnetic field generator includes at least one magnet that is coupled to a rotating device.

In accordance with another embodiment of the present invention, the Wiegand effect energy generator is combined with an electrical circuit that receives as its power source the output of the Wiegand effect energy generator.

As an aspect of this embodiment of the present invention, the electrical circuit is a transmitter that transmits an information signal upon being powered by the power source.

As a feature of this aspect, the transmitter is a radio frequency transmitter that transmits a radio signal upon being powered by the power source.

As a further feature, a radio frequency receiver is operable to receive the radio signal that is transmitted by the radio frequency transmitter.

As an additional feature, the transmitted radio signal represents the occurrence of the generation of the alternating magnetic field and the receiver counts the occurrences of the generation of the alternating magnetic fields.

As yet a further feature, the alternating magnetic field is generated by the rotation of at least one magnet coupled to a valve of a meter wherein the valves rotates upon the occurrence of a predetermined event (e.g., the flow of a predetermined amount of a gas or liquid through the meter) such that the transmission of a respective information signal represents the occurrence of the predetermined event.

As another aspect of the present invention, the electrical circuit is a transmitter for use in an alarm system.

As a further aspect, the electrical circuit is a counter circuit that increments a count value therein each time it is powered by the Wiegand sensor.

In accordance with a further embodiment of the present invention, a method of powering a circuit is provided by generating an alternating magnetic field, responding to the alternating magnetic field (i.e., by use of a Wiegand sensor), producing a power output signal solely from the response to the alternating magnetic field, and powering a circuit from the power output signal produced from the response to the alternating magnetic field.

As a feature of this embodiment, the alternating magnetic field is generated by the rotation of at least one magnet coupled to a rotatable valve of a meter (e.g., a water or gas meter), and the method further is carried out by placing the meter in an inaccessible location within a facility, providing at an accessible location a receiver that receives each transmitted information signal, and maintaining the number of occurrences the transmitted information signal is received.

BRIEF DESCRIPTION OF THE DRAWINGS

The following detailed description, given by way of example and not intended to limit the present invention solely thereto, will best be appreciated in conjunction with the accompanying drawings, wherein Eke reference numerals denote like elements and parts, in which:

FIG. 1 is a block diagram of the Wiegand effect energy generator of the present invention;

FIG. 2 is schematic illustration of the operation of a Wiegand sensor that may be utilized by the present invention; and FIGS. 3*a* and 3*b* are block diagrams of a transmitter and receiver, respectively, in which the Wiegand effect energy generator of the present invention may be utilized.

DETAILED DESCRIPTION OF CERTAIN PREFERRED EMBODIMENTS

When alternating magnetic fields of sufficient strength are applied to a Wiegand effect sensor, the Wiegand effect sensor produces output pulses. An exemplary Wiegand sensor that may be utilized by the present invention is the series 2000 sensor sold by EHD Corp. The Series 2000 Wiegand sensor produces pulses from alternating magnetic fields (actuators) that pass near the sensor. The amplitude of those pulses are determined by the field strength of the actuator. This Wiegand sensor, as well as other exiting Wiegand sensors, requires no external power. In accordance with the present invention, such a Wiegand sensor is utilized as a power source for an electronic circuit. Referring now to the drawings, FIG. 1 is a block diagram of the Wiegand effect energy generator of the present invention wherein a Wiegand sensor 10 is provided as the power source.

Referring next to FIG. 2, a configuration for the Wiegand sensor is illustrated wherein actuators 12, 14, etc., in the form of magnets, rotate. Although the operation of wiegand sensor is well known in the art, a basic description thereof is provided. As actuator 12 pivots about point A and is in a position that is in close proximity to Wiegand sensor 10, as shown in FIG. 2, a magnetic field B that is formed forces a Wiegand wire within the Wiegand sensor 10 to be magnetized in a confluent state wherein both the core and shell of the Wiegand wire are magnetized in the same (e.g., positive) direction. During rotation, actuator 12 moves away from Wiegand sensor 10 and actuator 14 moves toward Wiegand sensor 10. Actuator 14 is a magnet with its poles opposite to that of actuator 12 and as actuator 14 approaches Wiegand sensor 10, a negative magnetic field forms, at which point, the core of the Wiegand wire within Wiegand sensor 10 switches its direction of magnetization from positive to negative. This is considered to be the reverse state of the Wiegand wire. The switching from the positive state to the reverse state results in a significant output pulse in the sensor output. As actuator 14 comes in close proximity with Wiegand sensor 10, the negative field strength grows stronger and the direction of magnetization of the shell of the Wiegand wire switches from positive to negative, wherein the core and shell of the Wiegand wire are now in a negative confluent state.

As the rotation continues, another actuator in the form of a magnetic with its poles opposite to that of actuator 14 approaches the Wiegand sensor to produce a positive magnetic field thereby. At a relatively small positive field, the core of the Wiegand wire within Wiegand sensor 10 switches it direction of magnetization from negative to positive thus resulting in a significant output pulse from the Wiegand sensor. As the actuator continues to move towards the Wiegand sensor, the positive field grows in strength and the direction of magnetization of the shell of the Wiegand wire switches from negative to positive resulting in a core and shell that are magnetized in the same direction. This cycle repeats itself as the actuators continue to rotate. Thus, it is seen that alternating magnetic fields passing near the Wiegand sensor produces output pulses therein.

Figure 1:
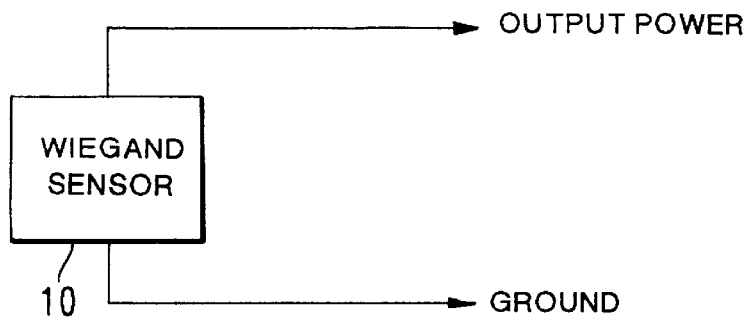
Figure 2:
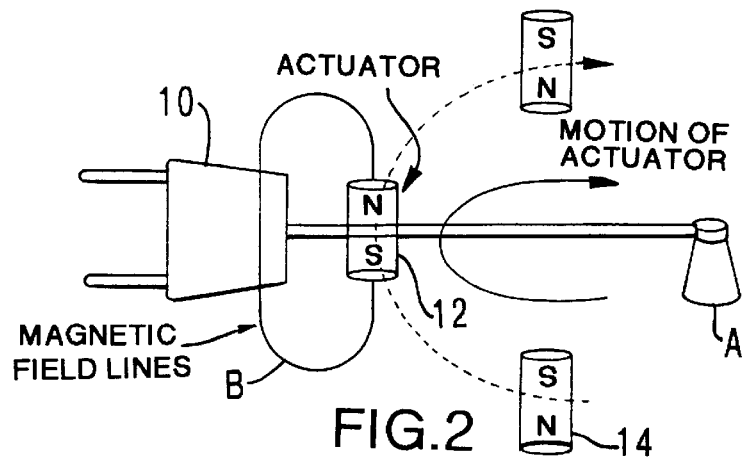
Figure 3A:
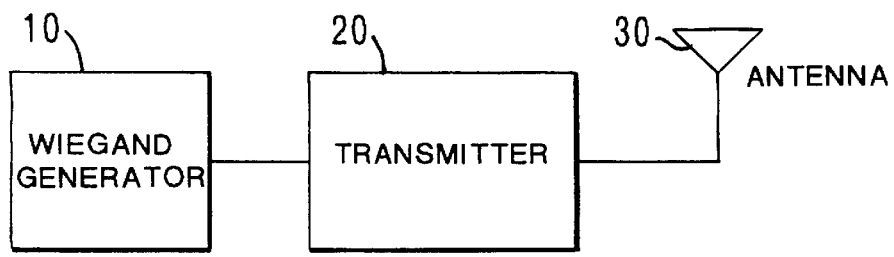
Figure 3B:
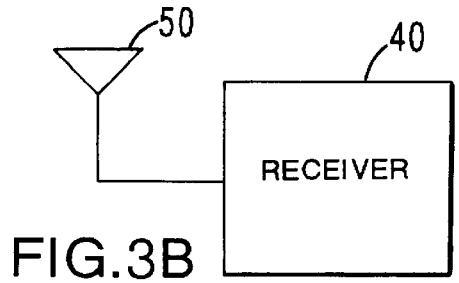

In accordance with a first exemplary embodiment of the present invention, the Wiegand effect energy generator of the present invention is utilized to operate a low power radio frequency transmitter, such as shown in block form in FIG. 3a. As shown, Wiegand generator 10 is coupled a transmitter 20 which, in turn, is coupled to an antenna 30. A receiver 40 shown in block form in FIG. 3b receives via an antenna 50 the transmitted signal.

An exemplary application in which the Wiegand effect energy generator of the present invention may be utilized is in combination with a gas or water meter (or other suitable meter). In the exemplary application, Wiegand generator 10 and transmitter 20 are mounted on a gas or water meter wherein the motion of the meter causes permanent magnets within the meter to move in relation to the Wiegand generator. As alternating poles of the permanent magnets are presented to the Wiegand generator, energy pulses are produced. Such energy pulses generally are, for example, between 5 and 6 volts and 10 microseconds in width. Such an energy pulse has sufficient power to power a low power transmitter (i.e., transmitter 20). The transmitter upon receiving each pulse output from Wiegand generator 10 "wakes up" and transmits a single identification signal. This identification signal may be any appropriate signal that can be recognized and distinguished from extraneous signals. Transmitter 20 then goes back to "sleep" (i.e., is de-powered) until the next energy pulse is received. Receiver 40, via antennas 30 and 50, receives the transmitted signals and such reception indicates that the meter has accumulated another pulse count. Receiver 40 contains its own power source or, alternatively, is externally powered by, for example, the telephone line or other appropriate power source. Receiver 40 accumulates (i.e., keeps track of) the pulse count and stores therein the accumulated value.

In accordance with the present invention, the Wiegand generator and transmitter that are attached or coupled to the device being monitored (e.g., a gas or water meter) are self-powered and, thus, do not require an internal or external power source. This advantageous feature of the present invention in turn allows for the placement of such metering equipment in generally inaccessible locations, such as behind a wall in a home or building. Furthermore, the receiver may be placed suitably near transmitter 20 but in a more accessible location, for example, on the exterior of the home or building. This results in convenient access to the receiver by, for example, a utility company serviceman. Receiver 40 may also be connected to a telephone line so that the information stored therein is remotely accessible.

As previously discussed, Wiegand generator 10 may be mounted on a gas or water meter wherein appropriate magnets are installed within the rotating valve(s) of the meter. Rotation of the valve, which represents water or gas displacement, is detected by the Wiegand generator which, in turn, produces therefrom output pulses that are utilized to power transmitter 20. Appropriate transmitters that may be utilized by the present invention are well known in the art and thus further description thereof is omitted therein. The combination of a Wiegand effect energy generator and a transmitter has no moving parts and generally requires little to no maintenance over its anticipated life. This advantageous feature in combination with the self-powering feature of the combination further advantageously allows for such devices to be placed at locations within a house or building that were not previously utilized (i.e., not accessible).

Another exemplary application in which the Wiegand effect energy generator of the present invention may be utilized is in combination with an alarm system. In this exemplary application, and with reference again to FIGS. 3a and 3b, Wiegand generator 10 and transmitter 20 are mounted on a door, window or other item (e.g., cabinet door, drawer, etc.) for which security is desired. The motion of the door or window causes permanent magnets to move in relation to the Wiegand generator. Like the previously discussed example, as alternating poles of the permanent magnets are presented to the Wiegand generator, energy pulses are produced, and such energy pulses generally are, for example, between 5 and 6 volts and 10 microseconds in width. Also like the previously discussed example, such an energy pulse has sufficient power to power a low power transmitter (i.e., transmitter 20). The transmitter upon receiving each pulse output from Wiegand generator 10 "awakes up" and transmits a single identification signal. This identification signal may be an appropriate "security" signal that can be recognized and distinguished from extraneous signals. Transmitter 20 then goes back to "sleep" (i.e., is de-powered). A receiver (e.g., receiver 40) receives the transmitted security signal which generally indicates that the window or door has been moved. Of course, multiple sensors each comprising a respective Wiegand generator and transmitter may be utilized in the security system, with each transmitter transmitting a respective "security" signal. Receiver 40, upon reception of the transmitted security signal, supplies appropriate information to a security system which, in turn, sounds an alarm, contacts the police, or performs some other appropriate action. Other actions may include verbally requesting the "intruder" to enter a security code into a keypad within some period of time (e.g., 30 seconds), causing a video camera to begin recording the "intruder", etc.

In accordance with the security alarm system example of the present invention, the Wiegand generator and transmitter (or multiple Wiegand generators and transmitters), operating as a security system, are self-powered. Thus, batteries do not need to be replaced which advantageously allows each "sensor" (i.e., each Wiegand generator and transmitter) to be placed in somewhat inaccessible locations. The receiver can be located in an accessible location. The receiver, if desired, can be powered by the telephone line.

A further exemplary application in which the Wiegand effect energy generator of the present invention may be utilized is as a non-powered counter/totalizer. In this exemplary application, the Wiegand generator is used to monitor rotational or linear motion. A Wiegand generator is coupled to the power source terminal of a non-volatile counter integrated circuit. As motion occurs, the Wiegand generator generates power which powers the integrated circuit which, in turn, stores a count value therein (e.g., by incrementing the previously stored count value). When the information stored in the integrated circuit is needed, a display can be attached to the counter circuit so as to display the stored count. As a non-powered counter, the Wiegand effect energy generator of the present invention can be utilized in numerous applications. For example, the non-powered exemplary embodiment can be utilized in conjunction with an odometer in a motorized vehicle, e.g., truck, trailer, etc., various metering applications, exercise equipment monitoring, machinery monitoring, etc.

In accordance with the present invention, when the Wiegand effect energy generator is utilized in combination with an odometer, for example, on a bicycle, the Wiegand effect energy generator is mounted on the forks of the bicycle or on some other part of the bicycle. Magnets are mounted on the wheel of the bicycle or some other location wherein rotation of one or more bicycle wheels causes the Wiegand effect energy generator to produce pulses. These pulses are utilized to power a non-volatile counter integrated circuit. The Wiegand effect energy generator may be utilized to power a very low power display, such as an LCD watch display, which could display the counts of the counter.

While the present invention has been particularly shown and described in conjunction with a preferred embodiment thereof it will be readily appreciated by those of ordinary skill in the art that various changes may be made without departing from the spirit and scope of the invention. For example, instead of coupling a transmitter to the Wiegand generator of the present invention, an LED or other appropriate output device may be coupled to and powered by the Wiegand generator. In such example, illumination of the attached LED may represent, for example, that a device is operating properly.

Therefore, it is intended that the appended claims be interpreted as including the embodiments described herein, the alternatives mentioned above, and all equivalents thereto.

What is claimed is:

1. A Wiegand effect energy generator in combination with an electrical circuit, the combination comprising:
field generating means for generating an alternating magnetic field;
a Wiegand sensor responsive to said alternating magnetic field and for producing an output in response thereto; and
an electrical circuit coupled to said Wiegand sensor for receiving said output as a power source, said electrical circuit performing a function upon being powered by said power source, said electrical circuit being a transmitter for transmitting an information signal upon being powered by said power source.

2. The combination of claim 1, wherein said Wiegand sensor includes a Wiegand wire, said Wiegand wire changing a magnetic state thereof in response to said alternating magnetic field.

3. The combination of claim 1, wherein said transmitter is a radio frequency transmitter for transmitting a radio signal upon being powered by said power source.

4. The combination of claim 3, further comprising a radio frequency receiver for receiving the radio signal transmitted by said radio frequency transmitter.

5. The combination of claim 4, wherein said transmitted radio signal represents the occurrence of the generation of the alternating magnetic field by said field generating means; and said receiver includes means for counting the occurrences of the generation of the alternating magnetic fields.

6. A Wiegand effect energy generator in combination with an electrical circuit, the combination comprising:
field generating means for generating an alternating magnetic field;
a Wiegand sensor having a Wiegand wire responsive to said alternating magnetic field and a pickup coil wound around said Wiegand wire for producing an output in response to said alternating magnetic field; and
an electrical circuit coupled to the pickup coil of said Wiegand sensor for receiving said output as a power source, said electrical circuit performing a function upon being powered by said power source, the power source output from said Wiegand sensor being the only power source of said electrical circuit.

7. A Wiegand effect energy generator in combination with an electrical circuit, the combination comprising:
field generating means for generating an alternating magnetic field;
a Wiegand sensor responsive to said alternating magnetic field and for producing an output in response thereto, said Wiegand sensor producing an output pulse each time the magnetic field generated by said field generating means alternates; and
an electrical circuit coupled to said Wiegand sensor for receiving said output as a power source, said electrical circuit performing a function upon being powered by said power source, said electrical circuit being a transmitter for transmitting an information signal upon being powered by each output pulse of said Wiegand sensor.

8. A Wiegand effect energy generator in combination with an electrical circuit, the combination comprising:
field generating means for generating an alternating magnetic field, said field generating means being comprised of at least one magnet coupled to a valve of a meter, said valve rotating upon the occurrence of a predetermined event;
a Wiegand sensor responsive to said alternating magnetic field and for producing an output in response thereto; and
an electrical circuit coupled to said Wiegand sensor for receiving said output as a power source, said electrical circuit performing a function upon being powered by said power source, said electrical circuit being a transmitter for transmitting an information signal upon being powered by said power source, each transmission of the information signal representing the occurrence of a rotation of the valve of the meter.

9. The combination of claim 8, wherein the predetermined event is the flow of a gas or liquid through the meter and the transmission of each respective information signal represents the flow of a predetermined amount of gas or liquid through the meter.

10. A Wiegand effect energy generator in combination with an electrical circuit, the combination comprising:

field generating means for generating an alternating magnetic field;

a Wiegand sensor responsive to said alternating magnetic field and for producing an output in response thereto;

an electrical circuit coupled to said Wiegand sensor for receiving said output as a power source, said electrical circuit performing a function upon being powered by said power source, the electrical circuit being a transmitter for transmitting an alarm signal upon being powered by said power source; and a receiver operable to be coupled to an alarm system, said receiver being operable to receive the transmitted alarm signal and to supply the alarm signal to said alarm system.

11. A Wiegand effect energy generator in combination with an electrical circuit, the combination comprising:

field generating means for generating an alternating magnetic field;

a Wiegand sensor responsive to said alternating magnetic field and for producing an output in response thereto; and an electrical circuit coupled to said Wiegand sensor for receiving said output as a power source, said electrical circuit performing a function upon being powered by said power source, the electrical circuit being a counter circuit, said counter circuit being operable to store a count value therein and to increase the count value upon being powered by the power source output by said Wiegand sensor.

12. A method of powering a circuit, comprising the steps of:

generating an alternating magnetic field;

responding to the alternating magnetic field;

producing a power output signal solely from the response to the alternating magnetic field;

powering a circuit from the power output signal produced from the response to the alternating magnetic field, the circuit being a transmitter; and transmitting by the transmitter of an information signal upon being powered by the power output source.

13. The method of claim 12, wherein the steps of responding to the alternating magnetic field and producing a power output signal are carried out by a Wiegand sensor having a Wiegand wire therein, wherein the step of responding is carried out by the Wiegand wire by changing a magnetic state thereof in response to the alternating magnetic field.

14. The method of claim 12, wherein the transmitting step is carried out by transmitting a radio signal upon being powered by the power output source.

15. The method of claim 14, further comprising the steps of receiving the radio signal and counting each occurrence of reception of the radio signal.

16. A method of powering a circuit, comprising the steps of:

generating an alternating magnetic field;

responding to the alternating magnetic field each time the generated magnetic field alternates;

producing a power output signal solely from the response to the alternating magnetic field; and powering a transmitter circuit from each power output signal produced from the response to the alternating magnetic field; and transmitting by the transmitter of an information signal each time the transmitter is powered by the power output signal.

17. The method of claim 16, wherein the step of generating an alternating magnetic field is carried out by at least one magnet coupled to a rotatable valve of a meter, said valve rotating upon the occurrence of a predetermined event; and each transmission of the information signal represents the occurrence of a rotation of the valve of the meter.

18. The method of claim 17, wherein the predetermined event is the flow of a gas or liquid through the meter and the transmission of each respective information signal represents the flow of a predetermined amount of gas or liquid through the meter.

19. The method of claim 18, further comprising the steps of placing the meter in a substantially inaccessible location within a facility, providing at an accessible location a receiver operable to receive each transmitted information signal, and maintaining the number of occurrences the transmitted information signal is received.

20. A method of powering a circuit, comprising the steps of:

generating an alternating magnetic field;

responding to the alternating magnetic field;

producing a power output signal solely from the response to the alternating magnetic field;

powering a circuit from the power output signal produced from the response to the alternating magnetic field, the circuit being a transmitter;

transmitting by said transmitter of an alarm signal upon being powered by said power source;

remotely receiving the transmitted alarm signal; and supplying the received alarm signal to an alarm system.

21. A method of powering a circuit, comprising the steps of:

generating an alternating magnetic field;

responding to the alternating magnetic field;

producing a power output signal solely from the response to the alternating magnetic field;

powering a circuit from the power output signal produced from the response to the alternating magnetic field, the circuit being a counter circuit;

storing within the counter circuit a count value; and increasing the count value stored in the counter circuit upon being powered by the power output source.

* * * * *